United States Patent
Dunn

(10) Patent No.: US 6,633,629 B1
(45) Date of Patent: Oct. 14, 2003

(54) WAVE DIVISION MULTIPLEXED SWITCH FABRIC

(75) Inventor: James Patrick Dunn, Northville Township, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/549,431

(22) Filed: Apr. 14, 2000

(51) Int. Cl.[7] .......................... H04B 10/12; H04Q 7/00
(52) U.S. Cl. ...................................... 379/56.2; 370/328
(58) Field of Search .......................... 379/56.2; 370/328

(56) References Cited

U.S. PATENT DOCUMENTS 5,657,374 A  * 8/1997 Russell et al. .............. 370/328
5,852,651 A  * 12/1998 Fischer et al. ............. 379/56.2

OTHER PUBLICATIONS

ITU–T Recommendation G.957; Series G: Transmission Systems and Media, Digital Systems and Networks, 6/99.
Bell Labs Technical Journal, Optical Networking, vol. 4, No. 1, Jan.–Mar. 1999.

* cited by examiner

Primary Examiner—Ahmad F. Matar
Assistant Examiner—Thjuan P Knowlin

(57) ABSTRACT

A plurality of switching modules (102) are interconnected via an optical link (104) to form a switching system (100). Different wavelengths of the optical link (104) are used to selectively direct communications between the plurality of switching modules. Wavelengths have a fixed or variable allocation to communications between switching modules. Wavelengths may be time multiplexed or further subdivided by fractional wavelengths. Communications between switching modules are accomplished by allocating wavelengths in the optical link to transmitting and selectively receiving the communications on the allocated wavelengths.

18 Claims, 4 Drawing Sheets

WAVE DIVISION MULTIPLEXED SWITCH FABRIC

FIELD OF THE INVENTION

The present invention relates generally to telephone switching systems, and in particular, to a telephone switching system based on a fiber optic switch fabric using wave division multiplexing.

BACKGROUND OF THE INVENTION

Modern telephone switching systems are large-scale, highly complex systems incorporating one or more switching elements cooperatively controlled and supervised by one or more computing means. One commercial exemplar of a modern telephone switching system is the 5ESS® ELECTRONIC SWITCHING SYSTEM, from Lucent Technologies Inc., 600 Mountain Avenue, Murray Hill, N.J. 07974. The 5ESS® electronic switch is a distributed switching system. Both the switching system capabilities and the control, supervision and administration capabilities are distributed. Each of the computing facilities associated with these distributed modules includes appropriate computer programs or software to achieve the desired operation of the switching elements and other components of the switching system.

The distributed switching modules are interconnected by a central fabric called a time-multiplexed switch. The time-multiplexed switch provides a means for the connected switching modules to communicate with each other. The number of links that can be connected to the time multiplexed switch controls the number of switching modules that are interconnected and ultimately, the size of the switch. Though sufficient to meet current needs, the limitations of the central fabric are challenged by trends such as (1) Internet access; (2) networks with edge remote access vehicles; (3) the change in network traffic from predominately voice to a mixture of voice, data, fax and video; and (4) transport protocols such as ATM, SONET, and TCP/IP.

Therefore, an evolution of the central fabric switch is required to further the distributed switching architecture without losing the scalability accomplished by interconnecting switching modules.

SUMMARY OF THE INVENTION

The limitations of the time-multiplexed switch central fabric are overcome and an improvement in the switching architecture is achieved with the use of a plurality of optical links between switching modules. The switching modules use wave division multiplex technology to communicate with each other over the optical links.

A method for switching telephone calls using wave division multiplex switching includes the step of receiving a call and determining a destination switching module that is to receive the telephone call. After the destination switching module is chosen, a wavelength of optical spectrum of the fiber optical cable interlinking the switching modules is allocated to carry data associated with the telephone call. The allocation may be a fixed allocation. That is, a wavelength may be dedicated to connecting one switching module to another switching module. Alternatively, the wavelength may be dynamically allocated with the allocation being communicated between the involved switching modules. After the wavelength is determined, data associated with the telephone call is transmitted between switching modules over the allocated wavelength.

In another arrangement, wavelengths of spectrum of an optical cable coupled to a plurality of switching modules are allocated such that a wavelength is dedicated for a connection to one of the plurality of switching modules from every other one of the plurality of switching modules. The plurality of switching modules communicate with each other by sending communications over the optical cable using the allocated wavelengths. The plurality of switching modules selectively demultiplex the optical communications to retrieve the wavelengths allocated to communications for the receiving switching module.

A telephone switching system in accordance with the invention includes a plurality of switching modules. An optical ring interconnects the switching modules. The switching modules communicate telephone calls to each other over the optical ring. Each switching module includes a wavelength transmitter that transmits optical signals having a certain wavelength of an optical spectrum over the optical link. Each switching module includes a wavelength demultiplexer that selectively receives certain wavelengths of an optical spectrum from the optical link. Preferably, a control processor is coupled to the wavelength transmitter and wavelength demultiplexer to allocate telephone calls through the switching modules to certain wavelengths for transport over the optical link.

DETAIL DESCRIPTION OF THE PREFERRED EMBODIMENTS

Figure 1:
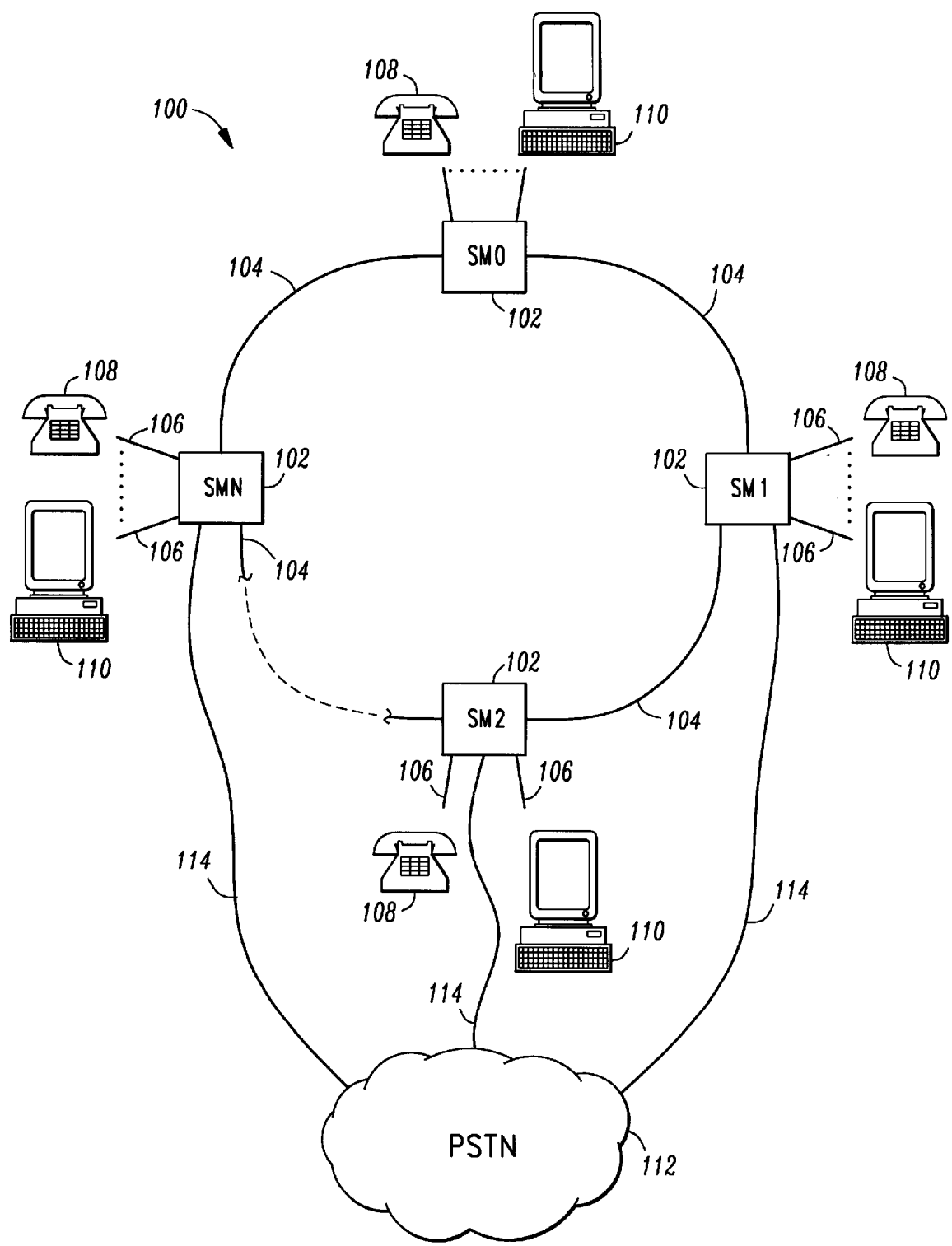
FIG. 1 is a block diagram of a switching system in accordance with the present invention.

FIG. 1 is a block diagram of a switching system 100 in accordance with the present invention. Switching system 100 includes a plurality of switching modules 102. Switching modules 102 are interconnected in a ring topology by optical links 104. Switching modules 102 communicate with each other by sending data over optical links 104. More specifically, switching modules 102 receive network traffic, for example, voice, data, audio, video, fax, and selectively route the network traffic to other switching modules 102.

FIG. 1 shows switching modules 102 coupled to customer premises equipment over lines 106. The exemplary customer premises equipment shown in FIG. 1 includes telephones 108 and computers 110. Switching modules 102 are also shown coupled to the public switched telephone network 112 by trunks 114 in a manner known to those of skill in the art.

In contrast to the prior art, switching modules 102 are not interconnected to a central switch fabric. Instead, switching modules 102 are interconnected via optical links 104. In accordance with the present invention, wave division multiplexing is used to allocate certain wavelengths that may travel in optical links 104 in a manner to simulate direct connections from any one switching module 102 to another switching module 102.

As used throughout this document, wavelength is used synonymously with nominal wavelength and in practice will include a range of wavelengths. That is, a certain wavelength may actually represent a range of actual wavelengths. For example, ITU-T Recommendation G.957 (1999), *Series G: Transmission Systems and Media, Digital Systems and Networks*, specifies a nominal wavelength of 1310 nanometers (nm) for intra-office and short-haul inter-office optical fiber systems. In practice, the acceptable range of wavelengths complying with the specification may range from 1260 nm to 1360 nm. The acceptable range of wavelengths for a nominal wavelength will vary with factors such as fiber type, source characteristics, system attenuation range, and dispersion of the optical path.

Switching modules 102 are preferably processor based apparatus controlled by software to implement traditional call processing and feature processing associated with switching modules. The switching modules 102 may also implement some traditional administrative functions such provisioning, system initialization, database functions, TMS path hunt, group resource allocation and common channel signaling seven protocols. In a distributed switching system, each switching module has knowledge of all routes in and out of the system. Each switching module has a subset of the physical routes or paths in and out of the system 100. To complete a call, a connection is required between the originating switching module and the terminating switching module, if the terminating and originating switching modules are different. In general, switching modules 102 are considered internal components (without regard to actual location) of switching system 100 and have no individual network identity apart from the switching system as a whole.

Optical links 104 are any suitable optical transport mechanism. For example, an OC192 SONET ring deployed with an eighty wavelength multiplexer may be used to interconnect up to eighty switching modules each having approximately 129,000 time slots each. This results in a switching system that can serve up to 10 million trunks in a toll configuration. Where optical link 104 is a standard transport arrangement, links 104 are used not only to interconnect switching modules as shown in FIG. 1, but also for trunk access and egress.

Figure 2:
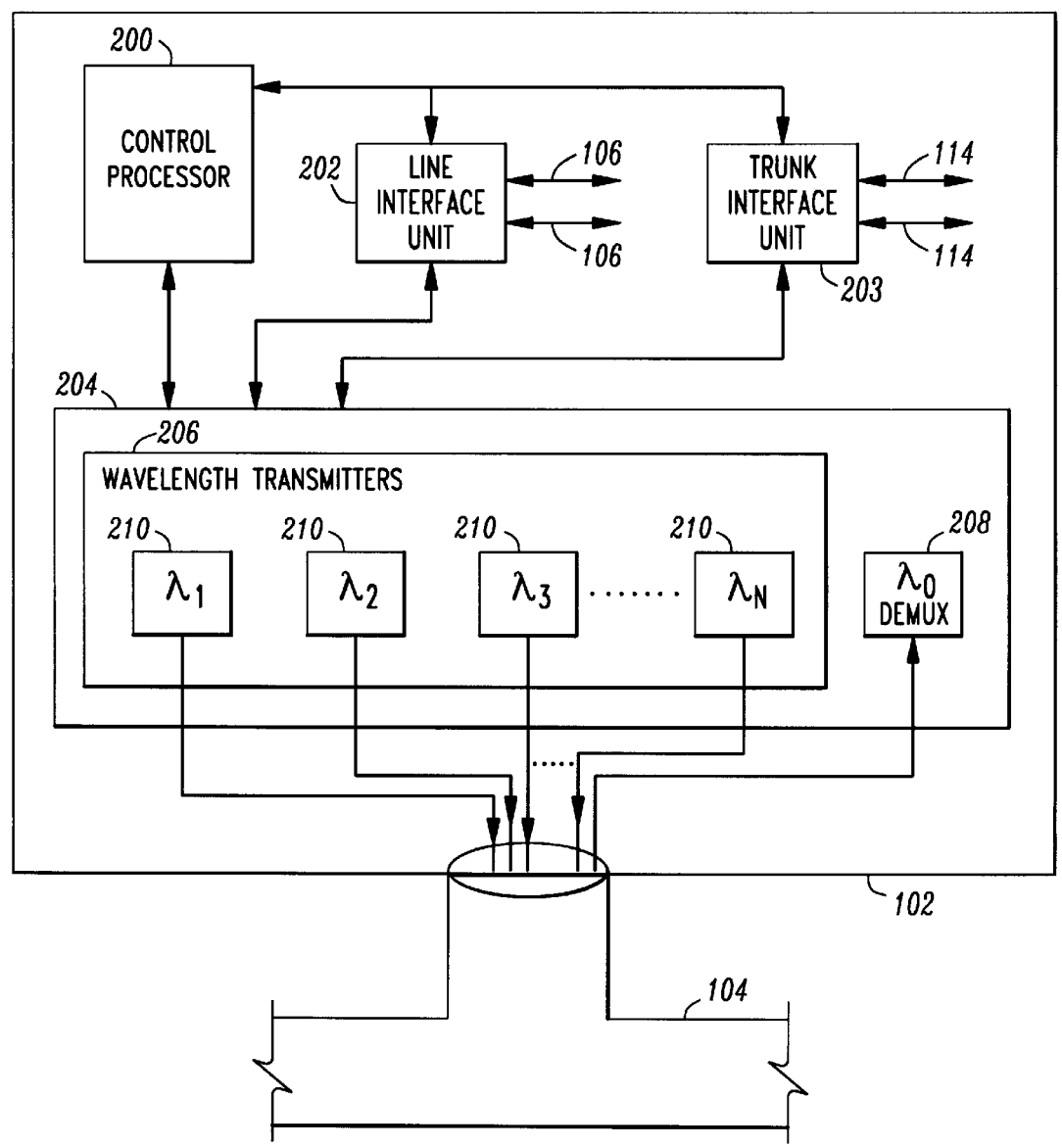
FIG. 2 is a block diagram of one of the switching modules shown in FIG. 1.

FIG. 2 is a block diagram of an exemplary switching module 102 in accordance with the present invention. In particular, FIG. 2 shows how switching module 102 interfaces to optical link 104. Switching module 102 includes a control processor 200, a line interface unit 202, a trunk interface unit 203 and an optical interface 204. Control processor 200 implements call processing features and other features as discussed above. Line interface unit 202 terminates lines 106 into switching module 102 and interfaces the information from and to lines 106 to optical interface 204. Similarly, trunk interface unit 203 terminates trunks into switching module 102 and interfaces the information from and to trunks 114 to optical interface 204.

Optical interface 204 interfaces switching module 102 to optical link 104. More specifically, optical interface 204 provides the electrical-to-optical conversions and multiplexing and demultiplexing of wavelengths to implement the wavelength multiplexed switching in accordance with the present invention.

Optical interface 204 includes transmitter 206 and receiver 208. Transmitter 206 produces an optical signal having a plurality of wavelengths. Receiver 208 receives an optical signal from optical link 104. The optical signal includes a plurality of wavelengths, of which one or more, but typically not all, carry data relating to switching module 102. Receiver 208 ignores wavelengths that are not relevant for a particular switching module.

Transmitter 206 includes a plurality of wavelength transmitters 210. Each transmitter 210 is associated with a different wavelength, color of light, or fraction of a wavelength. Wavelength transmitters 210 convert electrical signals, which may be received, for example from line interface unit 202, trunk interface unit 203, or control processor 200, into optical signals for transmission along optical link 104.

Optical interface 204 shown in FIG. 2 includes a plurality of transmitters 210 and a single receiver or demultiplexer 208. With this arrangement, switching modules are preferably configured such that each switching module is dedicated to receiving communications over a particular wavelength. For example, receiver 208 shown in FIG. 2 receives only communication sent over wavelength lambda zero. Multiple wavelength transmitters 210 are employed in transmitter 206. Typically, if there are N switching modules connected by optical link 104, then N minus 1 wavelength transmitters 210 are employed. Wavelength transmitters 210 are used to transmit messages to other switching modules connected via optical link 104. In particular, lambda 1 may be dedicated to switching module 1 and lambda 2 may be dedicated to switching module 2. With this arrangement, optical link 104 is used to interconnect any switching module to any other switching module on link 104. The wavelengths dedicated to communication between a particular pair of switching modules may be time multiplexed with each switching module connected to optical link 104 having a particular time slot for transmitting over the wavelength. Alternatively, a wavelength dedicated to a particular switching module may be further subdivided into fractional wavelengths which each may be dedicated to a transmitter.

Figure 3:
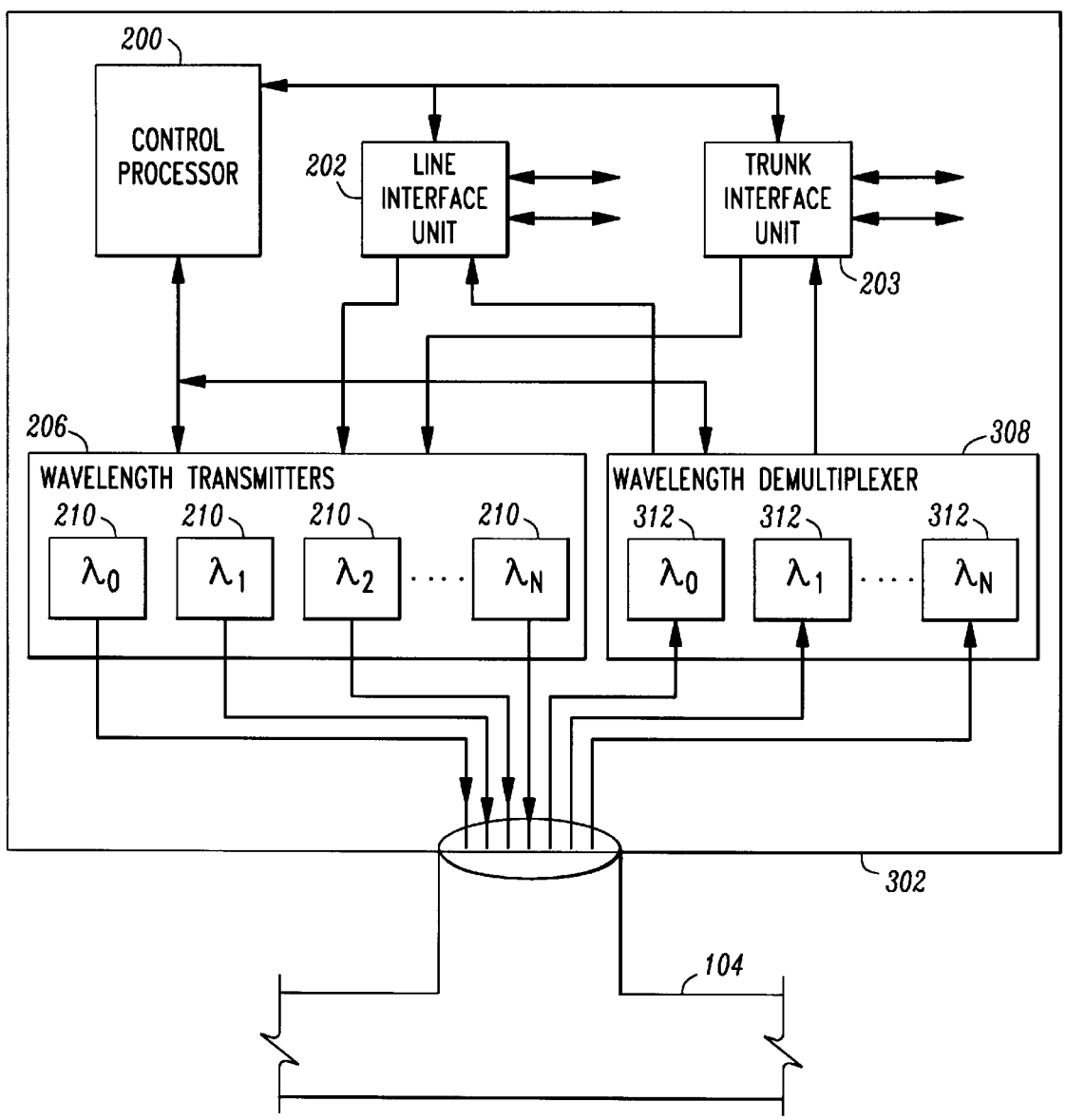
FIG. 3 is an alternate embodiment of one of the switching modules shown in FIG. 1.

The arrangement shown in FIG. 2 minimizes the number of receivers by dedicating a wavelength to a particular switching module. This has an effect on flexibility. An alternate embodiment of switching module 102 is shown in FIG. 3. Switching module 302 includes control processor 200, line interface unit 202, trunk interface unit 203, and transmitter 206, as shown and described with respect to FIG. 2. Switching module 302 includes a receiver or demultiplexer 308. Receiver 308 includes a plurality of wavelength demultiplexers 312. Each wavelength multiplexer 312 receives an optical signal from optical link 104 and demultiplexes a select wavelength of the optical signal. The arrangement shown in FIG. 3 advantageously allows for switching module 302 to vary the particular wavelengths received. By virtue of this arrangement, the wavelengths allocated to communication with a particular switching module may be varied. Preferably, a communication between a pair of switching modules is dedicated to a particular wavelength or fractional wavelength for communication.

Figure 4:
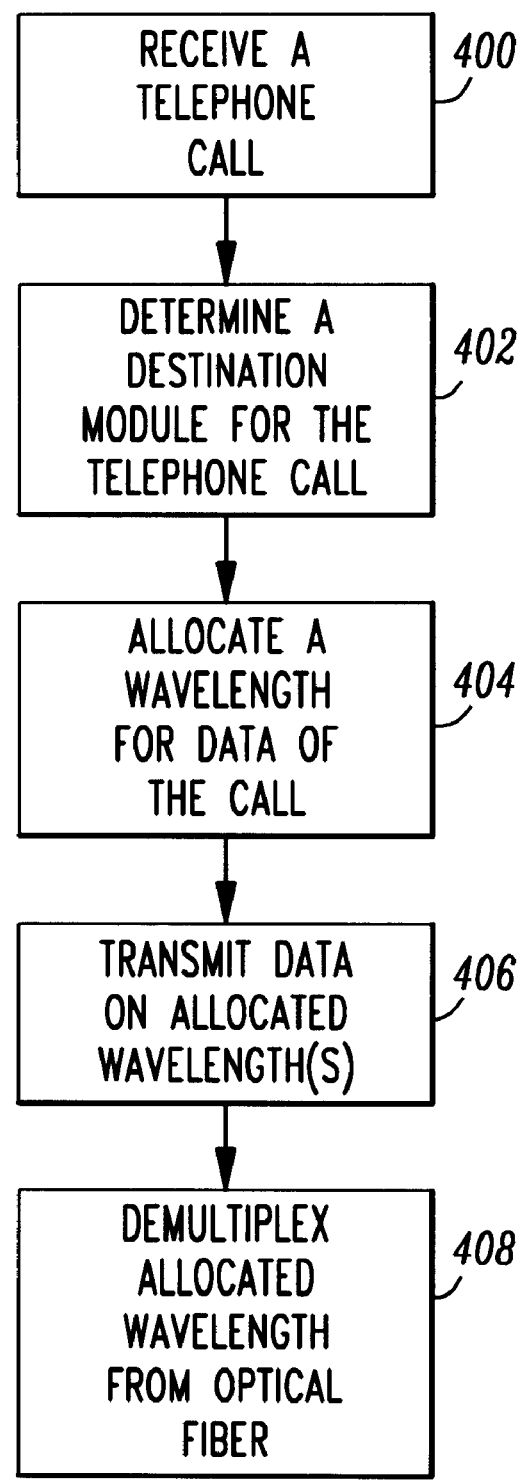
FIG. 4 is a flow chart illustrating a method for communicating in the switching system shown in FIG. 1.

FIG. 4 is a flow chart illustrating a preferred method for switching using a wave division multiplex switch fabric in accordance with the present invention. FIG. 4 is described below with respect to the preferred embodiment shown on FIGS. 1 through 3. At step 400, a telephone call is received by a switching module in the ordinary manner. In particular, a telephone 108 may initiate a telephone call with a switching module via line 106. Alternatively, the initiation of a call or a communication may be established in another manner, for example, by a trunk interface.

After the communication is initiated (400), a destination switching module is determined for the communication (402). That is, a path between the originating and terminating switching modules is determined for the call. For simplicity, it is assumed that the call is routed from one switching module 102 connected to link 104 to another switching module 102 that is also connected to link 104. As discussed above, link 104 may include trunk access and egress to another collection of switching modules interconnected by a link similar to link 104. In any event, after the route is determined (402), a wavelength must be determined for transmitting data associated with the call or communication over link 104 (404). In a preferred embodiment, each switching module receives communications over a dedicated wavelength. Therefore, once the route or switching modules involved in the communication are determined, the appropriate wavelengths are also determined. In an alternate preferred embodiment where the switching modules have an arrangement as shown in FIG. 3, a control or administrative processor may allocate on a per call or per communication basis a particular wavelength or wavelength pair for the newly initiated communication or call. Data associated with the call includes the actual call content, for example, pulse-code modulated audio samples and may or may not include control data typically associated with the telephone call. In some case call content and call control data are transmitted on different wavelengths, including an arrangement where control data for multiple calls are transmitted on a dedicated common wavelength for all switching modules.

Once the wavelengths for communication are determined, data is transmitted over the allocated wavelength (406). If time division multiplexing or further fractional wavelength multiplexing is employed then transmission and receipt of the call or communication is timed or partitioned accordingly.

The receiver demultiplexes the allocated wavelength to receive the data (408). In particular, the switching module receives the call or communication as timed or as wavelength multiplexed. The received data is transmitted to an end user that is the target of the call or communication by a switch terminating the end user. For example, line interface 202 may be used to terminate a call from a telephone 108 to another telephone 108.

As an alternative to allocating certain calls or routes to a particular wavelength, as discussed above, network traffic may be allocated to a particular wavelength based on content, that is, the type of traffic. For example, Ethernet traffic may be dedicated to a particular wavelength and asynchronous transfer mode (ATM) traffic may be dedicated to another wavelength. Other examples of content include Internet protocol, audio data, and video data. This arrangement allows the network traffic to be switched in its native mode.

As described above, a switching system uses wave division multiplexing over an optical cable to communicate between interconnected switching modules. The abundance of wavelengths in the optical cable is used to selectively interconnect switching modules such that a central time slot switch is not necessary. Advantageously, the optical link serves as a switch fabric as well as an interconnect for trunk access and egress.

The invention being thus described, it will be evident that the same may be varied in many ways. Such variations are not to be regarded as a departure from the spirit and scope of the invention and all such modifications are intended to be included within the scope of the appended claims.

What is claimed is:

1. A method for switching telephone calls between a plurality of telephone switching modules that comprise a single switching system, wherein each switching module of the plurality of switching modules has no individual network identity apart from the single switching system as a whole, the method comprising the steps of:
   A) receiving a telephone call;
   B) determining a first switching module of the plurality of switching modules to receive the telephone call;
   C) allocating a first predetermined wavelength of a spectrum of an optical cable to the telephone call; and
   D) transmitting data associated with the telephone call to the first switching module over the first predetermined wavelength.

2. The method of claim 1 further comprising the step of:
   E) transmitting control associated with the telephone call to the first switching module over a second predetermined wavelength of the spectrum of the optical cable.

3. The method of claim 2 wherein the first predetermined wavelength and the second predetermined wavelength are a same wavelength of the spectrum of the optical cable.

4. The method of claim 2 wherein the first predetermined wavelength and the second predetermined wavelength are different.

5. The method of claim 4 wherein the second predetermined wavelength is a common wavelength dedicated to control information for the plurality of switching modules.

6. The method of claim 2 further comprising the step of:
   F) the first switching module selectively receiving data associated with the telephone call by demultiplexing the first predetermined wavelength.

7. The method of claim 1 wherein step D further comprises transmitting data associated with the telephone call at a predetermined time slot.

8. The method of claim 1 wherein the first predetermined wavelength is determined based on a content of the telephone call.

9. The method of claim 8 wherein the content of the telephone call includes one of audio data, video data, asynchronous transfer mode protocol and Internet protocol.

10. The method of claim 1 wherein the first predetermined wavelength is a fraction of a wavelength.

11. A method for switching communications between a plurality of telephone switching modules that comprise a single switching system, wherein each switching module of the plurality of switching modules has no individual network identity apart from the single switching system as a whole, the plurality of switching modules being coupled one to another by an optical cable, each switching module of the plurality of switching modules being capable of receiving optical signals from the cable and each switching module of the plurality of switching modules being capable of sending optical signals over the optical cable, the method comprising the steps of;
   A) allocating a wavelength of an optical spectrum of the optical cable to communications from each one of the plurality of switching modules to every other one of the plurality of switching modules to produce a plurality of allocated wavelengths;
   B) the plurality of switching modules sending communications over the optical cable using the plurality of allocated wavelengths; and
   C) the plurality of switching modules receiving communications from the optical cable using the allocated wavelengths.

12. The method of claim 11 wherein the plurality of switching modules send communications in a plurality of time slots over the plurality of allocated wavelengths.

13. The method of claim 11 wherein the plurality of wavelengths include fractions of a wavelength.

14. A telephone switching system comprising:
- a plurality of switching modules that comprise a single switching system, wherein each switching module of the plurality of switching modules has no individual network identity apart from the single switching system as a whole;
- a fiber optic ring that couples the plurality of switching modules to each other for communication of telephone calls;
- each switching module of the plurality of switching modules comprising:
  - a wavelength transmitter that transmits optical signals of a first plurality of wavelengths of an optical spectrum over the fiber optic ring; and
  - a wavelength demultiplexer that receives a second plurality of wavelengths of the optical spectrum from the fiber optic ring; and
- wherein a plurality of telephone calls between the plurality of switching modules are transmitted over the fiber optic ring.

15. The system of claim 14 further comprising a control processor coupled to the plurality of switching modules to that allocates telephone calls through the switching system to certain wavelengths of the optical spectrum.

16. The system of claim 14 wherein each switching module comprises a control processor that allocates telephone calls through the each switching module to certain wavelengths of the optical spectrum based on a predetermined scheme allocating the certain wavelengths to certain switching modules.

17. The system of claim 14 wherein the wavelength demultiplexer ignores all but one of the second plurality of wavelengths.

18. The system of claim 16 wherein each switching module comprises a line interface unit that receives telephone calls from the wavelength demultiplexer and that transmits telephone calls to the wavelength transmitter.

* * * * *